United States Patent
Park et al.

(10) Patent No.: US 9,804,790 B2
(45) Date of Patent: Oct. 31, 2017

(54) METHOD OF OPERATING MEMORY CONTROLLER AND SEMICONDUCTOR STORAGE DEVICE INCLUDING MEMORY CONTROLLER

(71) Applicant: Samsung Electronics Co., Ltd., Suwon-si, Gyeonggi-do (KR)

(72) Inventors: Jun-bum Park, Suwon-si (KR); Ho-jun Shim, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 6 days.

(21) Appl. No.: 14/959,089

(22) Filed: Dec. 4, 2015

(65) Prior Publication Data
US 2016/0216899 A1 Jul. 28, 2016

(30) Foreign Application Priority Data
Jan. 28, 2015 (KR) .................. 10-2015-0013546

(51) Int. Cl.
G06F 12/00 (2006.01)
G06F 3/06 (2006.01)
G06F 12/02 (2006.01)

(52) U.S. Cl.
CPC ............ *G06F 3/0616* (2013.01); *G06F 3/061* (2013.01); *G06F 3/0655* (2013.01); *G06F 3/0679* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 6,564,288 | B2 | 5/2003 | Olarig et al. |
| 7,525,860 | B2 | 4/2009 | Hokenmaier |
| 8,111,556 | B2 | 2/2012 | Wang et al. |
| 8,432,765 | B2 | 4/2013 | Roohparvar |
| 8,472,274 | B2 | 6/2013 | Fai et al. |
| 2008/0100368 | A1 | 5/2008 | Ryu |
| 2012/0047319 | A1 | 2/2012 | Yoon et al. |
| 2013/0182507 | A1 | 7/2013 | Marko et al. |
| 2014/0098600 | A1 | 4/2014 | Kim et al. |
| 2014/0244947 | A1 | 8/2014 | Song |

FOREIGN PATENT DOCUMENTS

KR        10-1265894        5/2013

*Primary Examiner* — Brian Peugh
(74) *Attorney, Agent, or Firm* — Harness, Dickey & Pierce, P.L.C.

(57) ABSTRACT

Semiconductor storage devices and methods of operating the same are provided. The semiconductor storage device including a non-volatile memory device, and a memory controller configured to control the non-volatile memory device, the memory controller including a performance control module, the performance control module configured to control a performance level of the memory controller based on state information of the memory controller may be provided.

18 Claims, 15 Drawing Sheets

METHOD OF OPERATING MEMORY CONTROLLER AND SEMICONDUCTOR STORAGE DEVICE INCLUDING MEMORY CONTROLLER

CROSS-REFERENCE TO RELATED APPLICATION

This application claims the benefit of Korean Patent Application No. 10-2015-0013546, filed on Jan. 28, 2015, in the Korean Intellectual Property Office, the disclosure of which is incorporated herein in its entirety by reference.

BACKGROUND

The inventive concepts relate to methods of operating a memory controller and semiconductor storage devices including the memory controller, and more particularly, to memory controllers, which control performance levels of the memory controllers by taking into account the memory controllers' lifetimes, and/or semiconductor storage devices including the memory controllers.

With the advent of the information-oriented society, the amount of data which each individual person desires to store and transfer has explosively increased. Due to an increase in demand for such a high-capacity data storage medium, various types of personal data storage devices have been developed.

Among semiconductor storage devices, hard disk drives (HDDs) have been widely used due to their advantages, such as high recording density, high data transmission rates, fast data access times, and low price. However, because HDDs have a relatively complex structure including, for example, mechanical parts, the HDDs are vulnerable to issues caused by an external impact and/or a vibration.

Recently, solid state disks (SSDs) using flash memories have been developed as data storage devices for replacing the HDDs. Unlike HDDs, SSDs do not include mechanical parts. Accordingly, SSDs may reduce latency and other mechanical driving times associated with HDDs, and thus, perform relatively high speed read and write operations. Also, SSDs may improve the reliability of read and write operations because errors occurring due to latency and mechanical friction can be reduced. Further, because of relatively low heat and/or relatively low noises while operating SDDs and a relatively high resistance to an external impact of SDDs, SDDs are generally regarded as data storage devices suitable for mobile devices, compared to HDDs, and are being actively studied to improve the reliability and operation speeds of semiconductor storage devices.

SUMMARY

The inventive concepts provide methods of operating a memory controller, which controls a performance level of the memory controller by taking into account the memory controller's lifetime.

The inventive concepts provide semiconductor storage devices including a memory controller, which controls a performance level of the memory controller by taking into account the memory controller's lifetime.

According to an example embodiment of the inventive concepts, a semiconductor storage device includes a non-volatile memory device, and a memory controller configured to control the non-volatile memory device, the memory controller including a performance control module, the performance control module configured to control a performance level of the memory controller based on state information of the memory controller.

The state information may include at least one of lifetime information of the memory controller and performance information of the memory controller.

The performance information may include the performance level before performing the operation and the lifetime information may include at least one of an initial lifetime, a reduced lifetime, and a residual lifetime of the memory controller.

The performance level may correspond to at least one of the number of commands processed by the memory controller per unit time, the amount of data written by the memory controller per unit time, and the amount of data read by the memory controller per unit time.

The semiconductor storage device may further include a timer configured to count an operation execution time of the memory controller and store the time as a using time information of the memory controller, wherein when a using time included in the using time information is equal to or greater than a reference using time included in reference using time information and a lifetime included in the lifetime information is equal to or less than a reference lifetime included in reference lifetime information, the performance control module is configured to set a limited performance level of the memory controller based on the lifetime information and the using time information, and controls the performance level of the memory controller so as to be equal to or less than the limited performance level.

The performance control module may be further configured to determine whether an adjustment of the performance level of the memory controller is desired, based on an operating state of the memory controller, and control the performance level of the memory controller based on the determination result.

The performance control module may be further configured to increase the input voltage when an improvement of the performance level of the memory controller is desired, and decrease or maintain the input voltage when an improvement of the performance level of the memory controller is not desired.

According to an example embodiment of the inventive concepts, a method of operating a memory controller, the method includes receiving an operation command from a host, determining whether to limit a performance level of the memory controller based on lifetime information of the memory controller, controlling the performance level of the memory controller, based on a result of the determining, and performing an operation corresponding to the operation command.

The determining may include determining whether a using time included in using time information generated by counting an operation execution time of the memory controller is equal to or greater than a reference using time included in reference using time information and determining whether a lifetime included in the lifetime information is equal to or less than a reference lifetime included in reference lifetime information.

The controlling may include setting a limited performance level of the memory controller when the using time is equal to or greater than the reference using time and the lifetime is equal to or less than the reference lifetime, and adjusting the performance level of the memory controller so as to be equal to or less than the limited performance level.

According to an example embodiment, a semiconductor storage device includes a non-volatile memory device, and a memory controller configured to control the non-volatile memory device according to a command from a host, the memory controller including a host interface configured to exchange at least one of commands and data with a host, an information buffer configured to store state information, the state information including at least one of lifetime information of the memory controller and performance information of the memory controller, and a processor configured to receive the state information from the information buffer and control a performance level of the memory controller based on the state information thereof and an expected using time thereof.

The memory controller may further include a central processing unit (CPU), the CPU is configured to execute a data read or a data write operation to or from the non-volatile memory device, and the processor is further configured to set a performance level of the CPU as a performance level of the memory controller The memory controller may further include a clock signal generator configured to generate a clock signal having a frequency varying according to an input voltage, and the processor is further configured to control the performance level of the CPU by adjusting by adjusting a clock frequency applied to the CPU based on a state information of the CPU and an expected using time of the CPU.

The performance information may include the performance level after completing an immediate previous operation and the lifetime information includes at least one of an initial lifetime, a reduced lifetime, and a residual lifetime of the memory controller.

The memory controller may further include a timer configured to count an operation execution time of the memory controller and store the time in the information buffer as a using time information of the memory controller.

BRIEF DESCRIPTION OF THE DRAWINGS

Some example embodiments of the inventive concepts will be more clearly understood from the following detailed description taken in conjunction with the accompanying drawings in which.

DETAILED DESCRIPTION OF THE EMBODIMENTS

Figure 1:
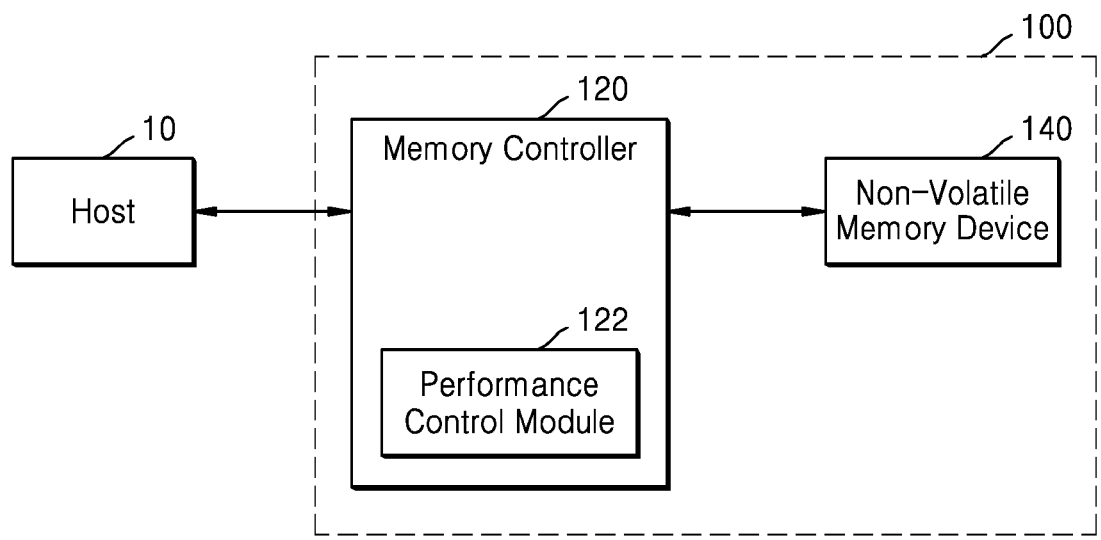
FIG. 1 is a block diagram of a computer system including a semiconductor storage device according to an example embodiment of the inventive concepts.

The inventive concepts will now be described more fully hereinafter with reference to the accompanying drawings, in which various example embodiments of the inventive concepts are shown. These example embodiments are provided so that this disclosure is thorough and complete and fully conveys the scope of the inventive concepts to one skilled in the art. Accordingly, while the inventive concepts can be modified in various ways and take on various alternative forms, specific example embodiments thereof are shown in the drawings and described in detail below as examples. There is no intent to limit the inventive concepts to the particular forms disclosed. On the contrary, the inventive concepts are to cover all modifications, equivalents, and alternatives falling within the spirit and scope of the appended claims. Like reference numerals refer to like elements throughout. In the drawings, the thicknesses of layers and regions may be exaggerated for clarity.

The terminology used herein is for the purpose of describing particular example embodiments only and is not intended to be limiting of the inventive concepts, As used herein, the terms "comprises" and/or "comprising," when used in this specification, specify the presence of stated features, integers, steps, operations, elements, and/or components, hut do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of the inventive concepts.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list.

Meanwhile, when it is possible to implement any example embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which this inventive concepts belong. It will be further understood that terms, such as those defined in commonly used dictionaries, should he interpreted as having a meaning that is consistent with their meaning in the context of the relevant art and will not be interpreted in an idealized or overly formal sense unless explicitly so defined herein. As used herein, the term "and/or" includes any and all combinations of one or more of the associated listed items.

FIG. 1 is a block diagram of a computer system 1 including a semiconductor storage device 100 according to an example embodiment of the inventive concepts.

Referring to FIG. 1, the computer system 1 may include a host 10 and the semiconductor storage device 100. The host 10 may process various commands desired for operations of the computer system 1, transmit processed results to the semiconductor storage device 100, and read or write data from or to the semiconductor storage device 100 in response to a read or write command. The semiconductor storage device 100 may include a memory controller 120 and a non-volatile memory device 140. The memory controller 120 may read data stored in the non-volatile memory device 140 and transmit the read data to the host 10, according to a read command received from the host 10. Also, the memory controller 120 may store data transmitted from the host 10 in the non-volatile memory device 140, according to a write command received from the host 10. The memory controller 120 may be connected to the host 10 according to peripheral component interconnect express (PCIe) interface and exchange data with the host 10, but the inventive concept is not limited thereto.

The memory controller 120 may include at least two command interfaces and exchange data with the non-volatile memory device 140. The memory controller 12.0 may provide a logical address for the non-volatile memory device 140 to the host 10 and provide a physical address to the non-volatile memory device 140, and may manage the non-volatile memory device 140 by using the physical address and convert the physical address into a logical address, The memory controller 120 may configure blocks having logically the same block number and pages having logically the same page number, in a plurality of non-volatile memories included in the non-volatile memory device 140, into a block group and a page group, respectively, which are logical units, to perform an arithmetical operation. In this case, the memory controller 120 may perform read and write operations and/or an erase operation in parallel with regard to the blocks having the same block number in the plurality of non-volatile memories for a page group.

Also, the memory controller 120 may be configured to include (e.g., by having a processor execute computer readable instructions stored in a memory) a performance control module 122. The memory controller 120 may have a certain lifetime, and a reduction of the lifetime may vary according to a performance level at which the memory controller 120 operates. For example, a reduction of the lifetime of the memory controller 120 that operates at an operating frequency of 600 MHz may be less than that of the memory controller 120 that operates at an operating frequency of 660 MHz. The performance control module 122 may control the performance level of the memory controller 120 so that the lifetime of the memory controller 120 is configured to be longer than an expected using time of the memory controller 120. The expected using time refers to an expected time during which the operation of the memory controller 120 is guaranteed. In an example embodiment, information about the lifetime of the memory controller 120 may include at least one of an initial lifetime, a reduced lifetime, and a residual lifetime of the memory controller 120. The performance level of the memory controller 120 may correspond to at least one of the number of commands processed by the memory controller 120 per unit time, the amount of data written by the memory controller 120 per unit time, and the amount of data read by the memory controller 120 per unit time. When performing a new operation according to a command from the host 10, information about the performance of the memory controller 120 may include a performance level of the memory controller 120 in a previous operation, which is performed immediately before performing the new operation. The performance control module 122 may control the performance level of the memory controller 120. A detailed operation of the performance control module 122 will be described later.

The non-volatile memory device 140, which is a storage device including a plurality of non-volatile memories, may store data received from the memory controller 120 and/or provide data to the memory controller 120. Also, the non-volatile memory device 140 may erase data stored therein, according to the control of the memory controller 120. The plurality of non-volatile memories may store or provide data in parallel through a plurality of buses according to the request of the memory controller 120. Also, the non-volatile memory device 140 may be designed as a multi-function PCIe device that may support at least two command interfaces. The plurality of non-volatile memories may be a flash memory, phase change random access memory (PRAM), or resistive random access memory (RRAM), but are not limited thereto. Further, dynamic random access memory (DRAM) may be included between the memory controller 120 and the non-volatile memory device 140 as a buffer (not shown) so as to increase a data transmission speed and improve operating efficiency. In an example embodiment, the semiconductor storage device 100 may be implemented as a solid state drive (SSD) or a secure digital (SD) card. The memory controller 120 may be an SSD controller.

Figure 2:
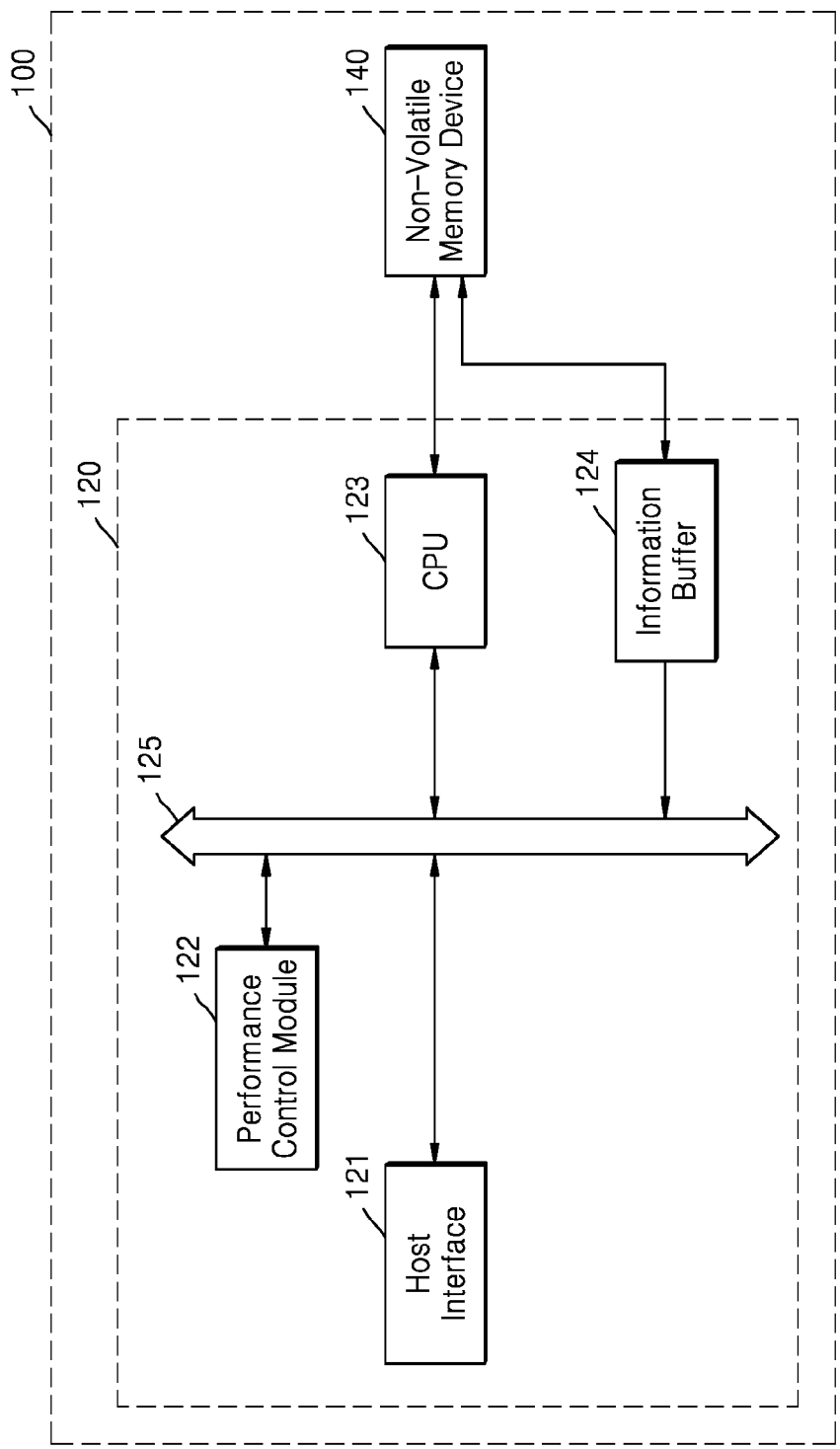
FIG. 2 is a block diagram of a semiconductor storage device according to an example embodiment of the inventive concepts.
Figure 3A:
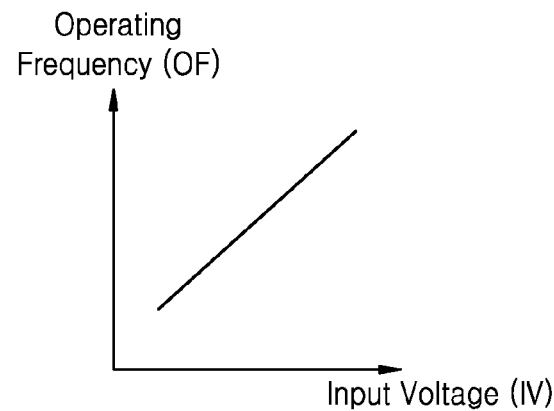
FIG. 3A is a graph showing a relation between an input voltage applied to a memory controller and an operating frequency of the memory controller.
Figure 3B:
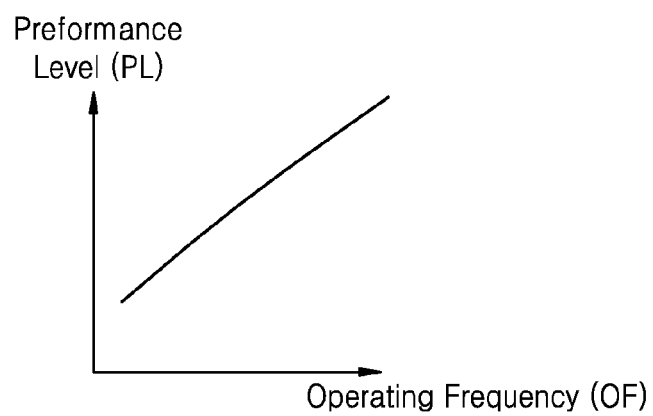
FIG. 3B is a graph showing a relation between an operating frequency of a memory controller and a performance level of the memory controller.
Figure 3C:
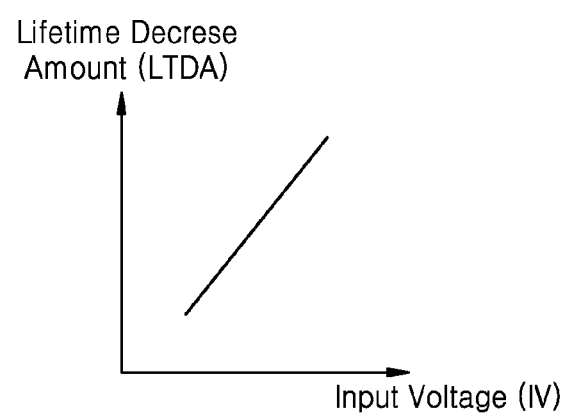
FIG. 3C is a graph showing a relation between an input voltage applied to a memory controller and a lifetime-decrease-amount (LTDA) of the memory controller.

FIG. 2 is a block diagram of a semiconductor storage device 100 according to an example embodiment of the inventive concepts. FIGS. 3A to 3C are graphs respectively showing a relation between an input voltage applied to a controller and an operating frequency of the controller, a relation between an operating frequency of the controller and a performance level of the controller, and a relation between an input voltage applied to the controller and a lifetime of the controller.

Referring to FIG. 2, the semiconductor storage device 100 includes a memory controller 120 and a non-volatile memory device 140. The memory controller 120 may include a host interface 121, the performance control module 122, a central processing unit (CPU) 123, and an information buffer 124. The host interface 121 may receive commands (e.g., a read command, a write command, an erase command, etc.) and data from the host 10 of FIG. 1, and may receive data read from the non-volatile memory device 140 through an internal bus 125 and transmit the received data to the host 10 of FIG. 1. The host interface 121 may be implemented with a PCIe interface module using a PCIe interface manner, but is not limited thereto.

The performance control module 122 may control the performance level of the memory controller 120 based on the relation graphs shown in FIGS. 3A to 3C. FIG. 3A illustrates a relation between an input voltage IV applied to the memory controller 120 and an operating frequency OF of the memory controller 120. As shown in FIG. 3A, as the input voltage IV increases, the operating frequency OF increases in proportion to the input voltage IV, FIG, 313 illustrates a relation between an operating frequency OF of the memory controller 120 and a performance level PL of the memory controller 120. As shown in FIG. 3B, as the operating frequency OF increases, the performance level PL. improves in proportion to the operating frequency OF of the memory controller 120. FIG. 3C illustrates a relation between an input voltage IV applied to the memory controller 120 and a lifetime-decrease-amount (LTDA) of the memory controller 120. As shown in FIG. 3C, as the input voltage IV increases, the LTDA increases in proportion to the input voltage IV. The LTDA denotes the extent that the lifetime of the memory controller 120 is reduced by performing an operation of the memory controller 120 in response to an operation command from a host. As the input voltage applied to the memory controller 120 increases, the LTDA of the memory controller 120 increases.

The performance control module 122 may control the operating frequency OF to control the performance level PL of the memory controller 120, For example, the performance control module 122 may increase the operating frequency OF to improve the performance level PL of the memory controller 120. In an example embodiment, a level of the input voltage IV that is applied to the memory controller 120 may be controlled to control the operating frequency OF of the memory controller 120. As the level of the input voltage IV increases, the LTDA of the memory controller 120 increases. Thus, the lifetime of the memory controller 120 may not reach the expected using time of the memory controller 120. Accordingly, the performance control module 122 may limit the improvement of the performance level PL of the memory controller 120 based on lifetime information regarding the lifetime of the memory controller 120 by taking into account the expected using time of the memory controller 120.

For example, the improvement of the performance level PL of the memory controller 120 may be limited by limiting the operating frequency OF by limiting the level of the input voltage IV, which is proportional to the operating frequency OF of the memory controller 120. Further, the performance level PL of the memory controller 120 may decrease by reducing the operating frequency OF of the memory controller 120, However, the inventive concepts are not limited thereto, and the operating frequency OF of the memory controller 120 may be controlled by various methods.

The information buffer 124 may store lifetime information, which includes at least one of an initial lifetime, a reduced lifetime, and a residual lifetime of the memory controller 120, and performance information which includes the performance level of the memory controller 120 that corresponds to at least one of the number of commands processed per unit time, the amount of data written per unit time, and the amount of data read per unit time. Before the power supply of the memory controller 120 is shut off, the lifetime information and the performance information, stored in the information buffer 124, may be stored in the non-volatile memory device 140. When the power supply of the memory controller 120 is turned on, the lifetime information and the performance information, which are stored in the non-volatile memory device 140, may be loaded in the information buffer 124.

The performance control module 122 may receive the lifetime information and the performance information from the information buffer 124, and may control the performance level of the memory controller 120 based on the lifetime information and the performance information.

The CPU 123 may perform several operations to write or read data to or from the non-volatile memory device 140. A performance level of the CPU 123 may be set as the performance level of the memory controller 120. When the performance level of the CPU 123 is improved, the several operations for writing or reading data may he rapidly performed.

The performance control module 122 may control the performance level of the CPU 123 by controlling a clock frequency provided to the CPU 123. As shown in FIG. 3B, the performance level of the CPU 123 may be proportional to the clock frequency. In an example embodiment, the performance level of the CPU 123 may increase by increasing the clock frequency of the performance control module 122, or may decrease by decreasing the clock frequency.

According to the memory controller 120, by controlling the performance level of the memory controller 120 based on the lifetime information and the performance information of the memory controller 120, the lifetime of the memory controller 120 may reach the expected using time of the memory controller 120, and effective and fast data input and output of the memory controller 120 may be implemented.

Figure 4:
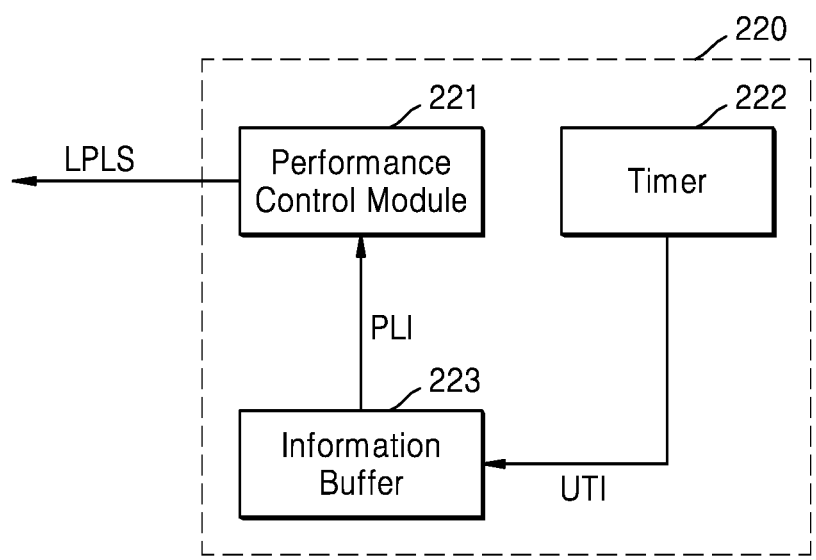
FIG. 4 is a block diagram of a memory controller according to an example embodiment of the inventive concepts.
Figure 5A:
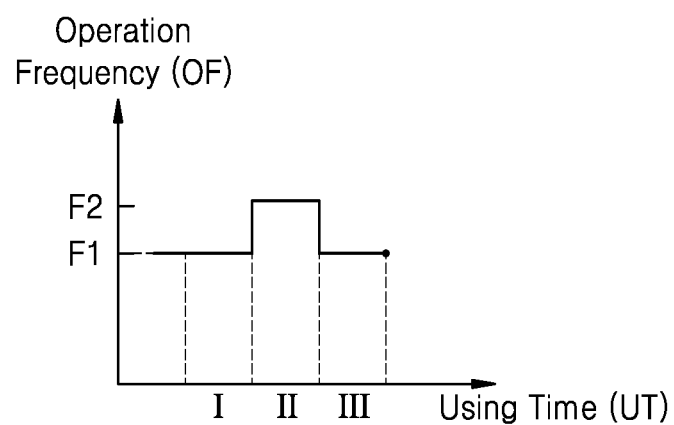
FIG. 5A is a graph showing a relation between an operating frequency of a memory controller and a lifetime of the memory controller.
Figure 5B:
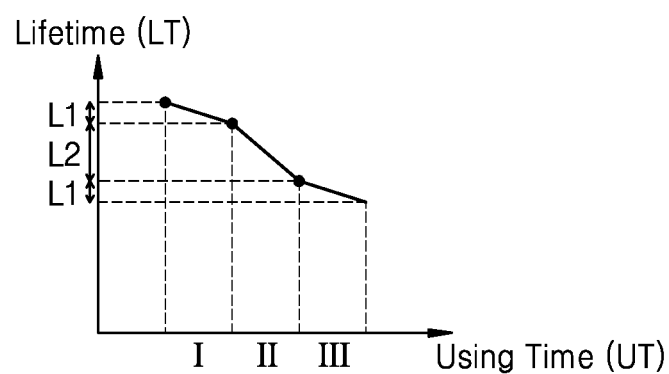
FIG. 5B is a graph describing a relation between the lifetime of a memory controller and an expected using time of the memory controller.

FIG. 4 is a block diagram of a memory controller 220 according to an example embodiment of the inventive concepts. FIG. 5A is a graph showing a relation between an operating frequency of the memory controller 220 and the lifetime of the memory controller 220, and FIG. 5B is a graph describing a relation between the lifetime of the memory controller 220 and the expected using time of the memory controller 220.

Referring to FIG. 4, the memory controller 220 includes a performance control module 221, a timer 222, and an information buffer 223.

Referring to FIGS. 4 and 5A, the memory controller 220 is driven at a driving frequency OF having an F1 value during a period I and a period III of the using time UT, and is driven at a driving frequency OF having an F2 value, which is greater than the F1 value, during a period II of the using time UT. In each period, the memory controller 220 performs an operation in response to the same operation command of a host. Because, in the period II, the memory controller 220 is driven at a driving frequency OF that is greater than that in the periods I and III, the performance level of the memory controller 220 in the period II is higher than that of the memory controller 220 in the periods I and III. In a period I and a period III of FIG. 5B, the lifetime of the memory controller 220 is reduced by L1. In a period II of FIG. 5B, the lifetime of the memory controller 220 is reduced by L2 that is greater than L1. That is, as the performance level of the memory controller 220 increases, the amount of reduction in the lifetime of the memory controller 220 increases.

Accordingly, if the performance level of the memory controller 220 is improved without considering the expected using time of the memory controller 220, the lifetime of the memory controller 220 may end before reaching the expected using time. Accordingly, the performance control module 221 may determine whether to limit the improvement of the performance level of the memory controller 220 before controlling the performance level of the memory controller 220.

Figure 5C:
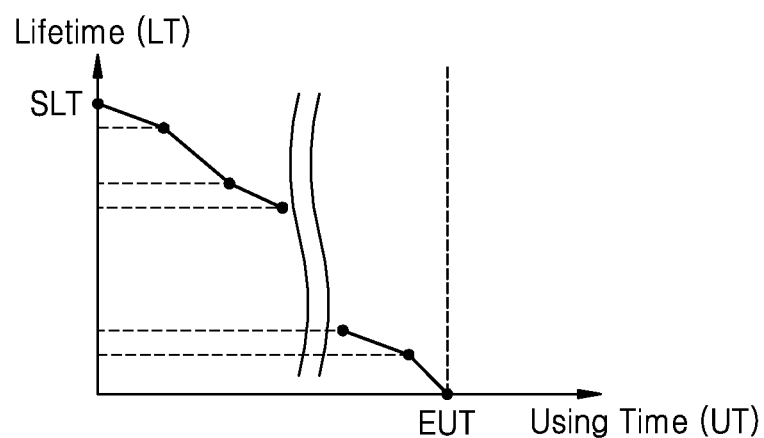
FIG. 5C is another graph describing a relation between a lifetime of a memory controller and an expected using time of the memory controller.
Figure 5D:
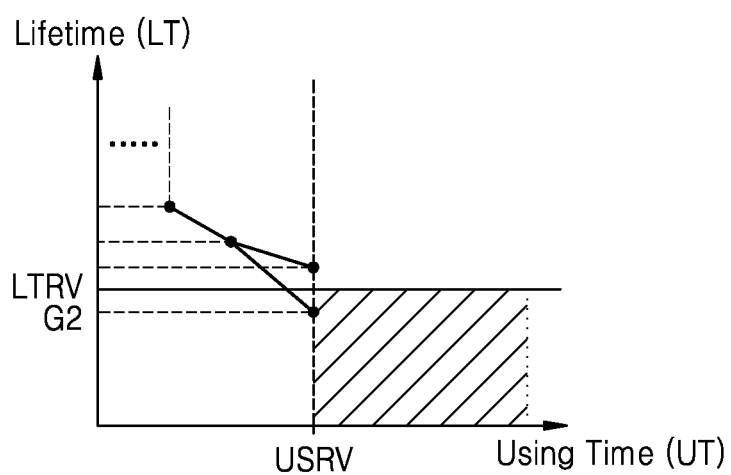
FIG. 5D is a graph describing a relation between a lifetime of a memory controller and an expected using time of the memory controller in association with criteria for limiting the improvement of the performance level of the memory controller.

FIG. 5C is another graph describing a relation between a lifetime of a memory controller and an expected using time of the memory controller. FIG. 5D is a graph describing a relation between a lifetime of a memory controller and an expected using time of the memory controller in association with criteria for limiting the improvement of the performance level of the memory controller.

Referring to FIGS. 4 and 5C, the memory controller 220 satisfies an expected using time EUT. Accordingly, a using time UT from when the lifetime of the memory controller 220 is an initial lifetime SUE to when the lifetime of the memory controller 220 is zero has to be greater than or equal to the expected using time EUT. Accordingly, the performance control module 221 may control the memory controller 220 so that the using time UT is greater than or equal to the expected using time EUT by controlling the performance level of the memory controller 220. Referring to FIG. 5D, the performance control module 221 may determine whether to limit the improvement of the performance level of the memory controller 220 based on lifetime information of the memory controller 220. In an example embodiment, when using time information UTI of the memory controller 220, which is to be described below, indicates that a reference using time USRV or more is used, and the lifetime LT of the memory controller 220, which is included in the lifetime information of the memory controller 220, is equal to or less than a lifetime reference value LTRV, (e.g., when the using time UT and the lifetime LT of the memory controller 220 are included in the shaded area of FIG. 5D), the performance control module 221 may limit the improvement of the performance level of the memory controller 220. For example, when the lifetime LT of the memory controller 220 corresponds to G2 and the using time UT corresponds to the reference using time USRV, the performance control module 221 may limit the improvement of the performance level of the memory controller 220. However, in another example embodiment, the performance control module 221 may limit the improvement of the performance level of the memory controller 220 by determining only whether the lifetime LT of the memory controller 220 is equal to or less than the lifetime reference value LTRV. The reference using time USRV and the lifetime reference value LTRV may be stored in the information buffer 223 when the reference using time USRV and the lifetime reference value LTRV are set by a user, for example, in advance, and may be variously adjusted depending on the operating characteristics or environment of the memory controller 220.

The timer 222 may count a time during which the memory controller 220 is turned on to perform an operation corresponding to an operation command of the host, and may store the time in the information buffer 223 as the using time information UTI. The using time information UTI may refer to a time used to perform operations corresponding to the operation command from the host after the memory controller 220 is turned on. The timer 222 may directly provide the using time information UTI to the performance control module 221. The information buffer 223 may store performance level limit information (PLI) and provide the PLI to the performance control module 221. The PLI may include the using time information UTI, the reference using time USRV, the lifetime reference value LTRV, the lifetime information, which includes at least one of an initial lifetime, a reduced lifetime, and a residual lifetime of the memory controller 120, and the performance information which includes the performance level of the memory controller 120 which corresponds to at least one of the number of commands processed per unit time, the amount of data written per unit time, and the amount of data read per unit time.

The performance control module 221 may limit the improvement of the performance level of the memory controller 220 based on the PLI received from the information buffer 223. In an example embodiment, by setting a limited performance level of the memory controller 220 based on the lifetime information and the using time information UTI, the performance control module 221 may control the performance level of the memory controller 220 so as to be equal to or less than the limited performance level. Also, the performance control module 221 may fix the performance level of the memory controller 220 to the limited performance level. In another example embodiment, in order to limit the improvement of the performance level of the memory controller 220, the performance control module 221 may limit a controllable input voltage level so as to be equal to or less than an input voltage limit level or fix the controllable input voltage level to the input voltage limit level, by setting the input voltage limit level and providing a limited performance level signal (LPLS) to a power management circuit providing an input voltage to the memory controller 220.

Figure 6:
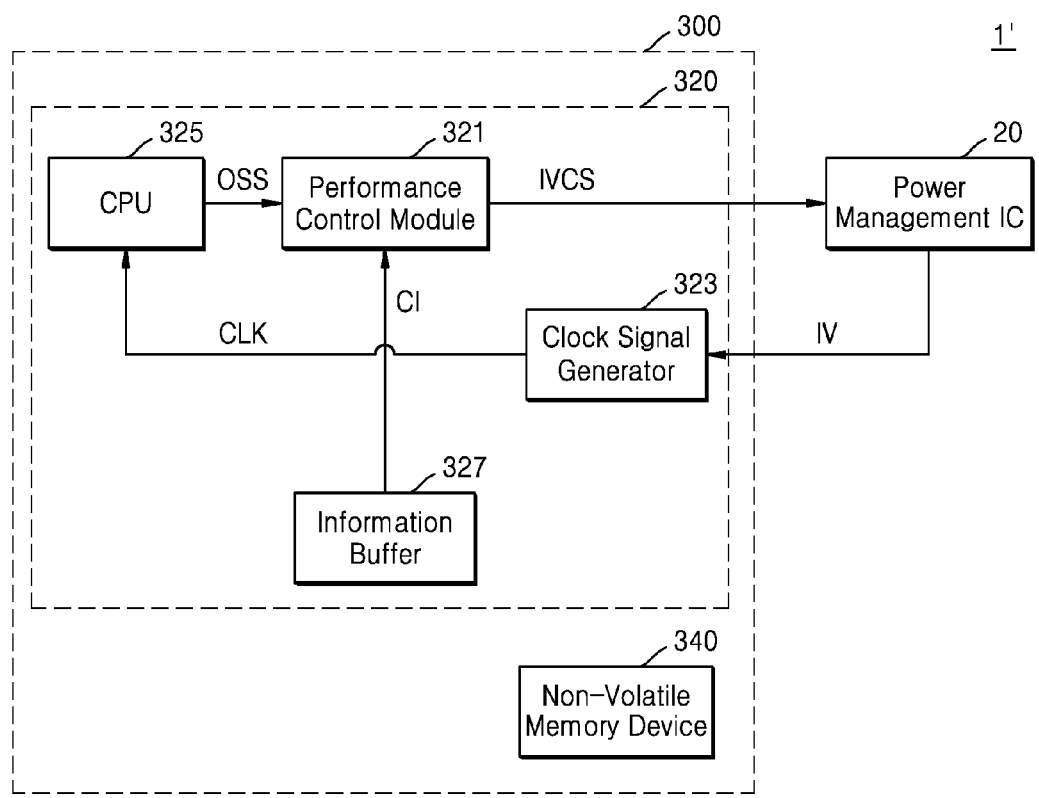
FIG. 6 is a block diagram of a computer system including a memory controller according to an example embodiment of the inventive concepts.

FIG. 6 is a block diagram of a computer system 1' including a memory controller 320 according to an example embodiment of the inventive concepts.

Referring to FIG. 6, the computer system 1' includes a semiconductor storage device 300, which includes the memory controller 320 and a non-volatile memory device 340, and a power management circuit 20, which provides a power supply voltage to the semiconductor storage device 300. The memory controller 320 includes a performance control module 321, a clock signal generator 323, a CPU 325, and an information buffer 327. The performance level of the memory controller 320 may correspond to the performance level of the CPU 325, and the performance control module 321 may control the performance level of the CPU 325. The performance control module 321 may change the frequency of a clock signal CLK, which is applied to the CPU 325, to control the performance level of the CPU 325. In an example embodiment, as the frequency of the clock signal UK increases, the performance level of the CPU 325 may be improved. Accordingly, when it is desired to improve the performance level of the CPU 325, the performance control module 321 may increase the frequency of the clock signal CLK to improve the performance level of the CPU 325. When it is not desired to improve the performance level of the CPU 325, the performance control module 321 may maintain or decrease the frequency of the clock signal UK to maintain or lower the performance level of the CPU 325. In an example embodiment of the inventive concepts, the performance control module 321 may control the frequency of the clock signal CLK by controlling a level of an input voltage IV, which is applied to the clock signal generator 323. As the level of the input voltage IV increases, the clock signal generator 323 may generate a clock signal CLK having a higher frequency. However, the clock signal generator 323 is not limited thereto. For example, as the level of the input voltage IV decreases, the clock signal generator 323 may generate a clock signal CLK having a higher frequency.

When the semiconductor storage device 300 performs an operation corresponding to an operation command received from a host, the performance control module 321 may control the performance level of the CPU 325 first. Before the performance control module 321 controls the performance level of the CPU 325, the CPU 325 may provide an operating state signal OSS to the performance control module 321 to inform the performance control module 321 of an operating state of the CPU 325, related to various control operations that are performed to write or read data to or from the non-volatile memory device 340. An operating state of the CPU 325 may correspond to an operating state of the memory controller 320. The performance control module 321 may determine whether the improvement of the performance level of the CPU 325 is desired based on the received operating state signal OSS. For example, when the number of read or write commands received per unit time by the memory controller 320 from the host is equal to or greater than a desired (or alternatively, predetermined reference value, the performance control module 321 may determine that the improvement of the performance level of the CPU 325 is desired.

The performance control module 321 may receive control information CI, which includes lifetime information of the memory controller 320 and performance information including the performance level of the CPU 325, from the information buffer 327. However, the inventive concepts are not limited thereto. For example, the performance control module 321 may determine whether the improvement of the performance level of the CPU 325 is desired based on the operating state signal OSS and the control information CI. Also, the performance control module 321 may determine how much improvement or reduction of the performance level of the CPU 325 is desired based on the operating state signal OSS and the control information CI or based on an operation command received from the host.

When it is determined that the improvement of the performance level of the CPU 325 is desired and the extent of the improvement of the performance level is determined, the performance control module 321 may provide an input voltage control signal IVCS, which is used for increasing the input voltage IV that is applied to the clock signal generator 323, to the power management circuit 20. The power management circuit 20 may be positioned outside the semiconductor storage device 300. The power management circuit 20 may provide the input voltage IV having a higher level than before to the clock signal generator 323, in response to the input voltage control signal IVCS so as to increase a level of the input voltage IV that is applied to the clock signal generator 323. Through this operation, the clock signal generator 323 may provide a clock signal CLK having a higher frequency than before to the CPU 325, and thus, the performance level of the CPU 325 may be improved.

When it is determined that the improvement of the performance level of the CPU 325 is not desired and the extent of the reduction of the performance level is determined, the performance control module 321 may provide the input voltage control signal IVCS, which is used for decreasing a level of the input voltage IV that is applied to the clock signal generator 323, to the power management circuit 20. The power management circuit 20 may provide the input voltage IV having a lower level than before to the clock signal generator 323, in response to the input voltage control signal IVCS so as to decrease a level of the input voltage IV that is applied to the clock signal generator 323. Through this operation, the clock signal generator 323 may provide the clock signal CLK having a lower frequency than before to the CPU 325, and thus, the performance level of the CPU 325 may be decreased.

When it is determined that the improvement of the performance level of the CPU 325 is not desired and it is determined to maintain the performance level of the CPU 325, the performance control module 321 may provide the input voltage control signal IVCS, which is used for maintaining a level of the input voltage IV that is applied to the clock signal generator 323, to the power management circuit 20. The power management circuit 20 may provide the input voltage IV having the same level as before to the clock signal generator 323, in response to the input voltage control signal IVCS so as to maintain a level of the input voltage IV that is applied to the clock signal generator 323. Through this operation, the clock signal generator 323 may provide the clock signal CLK having the same frequency as before to the CPU 325, and thus, the performance level of the CPU 325 may be maintained.

By controlling the performance level of the memory controller 320 through operations described above, the semiconductor storage device 300 may operate at a performance level, which is higher than a previous performance level, when a fast operation is desired, and may operate at the previous performance level or at a performance level, which is lower than the previous performance level, when a fast operation is not desired. Accordingly, the semiconductor storage device 300 may satisfy an expected using time of the memory controller 320 and operate relatively fast.

Figure 7A:
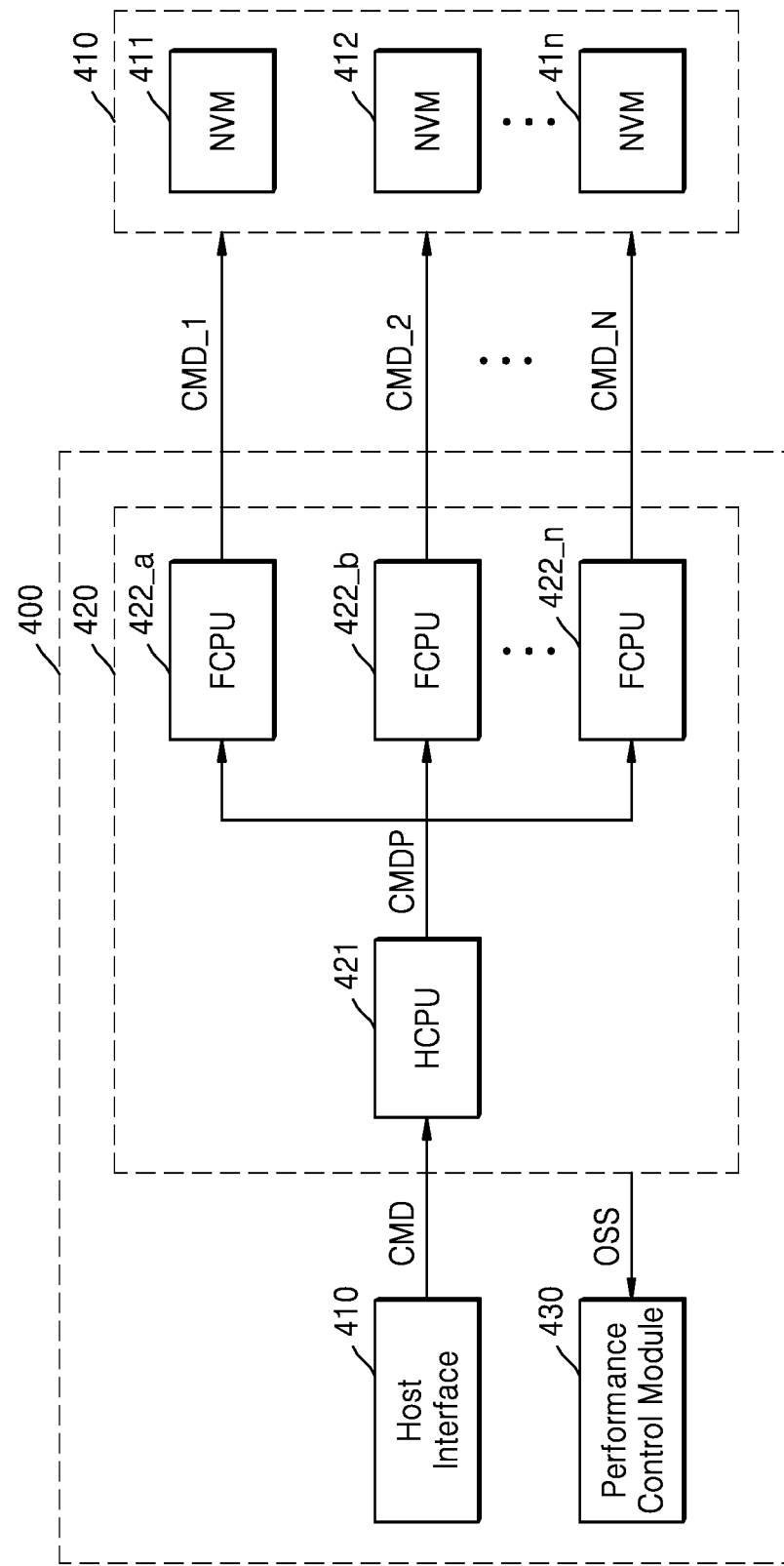
FIGS. 7A and 7B are diagrams describing a memory controller including a central processing unit (CPU) to which the improvement of a performance level is desired, according to an example embodiment of the inventive concepts.
Figure 7B:
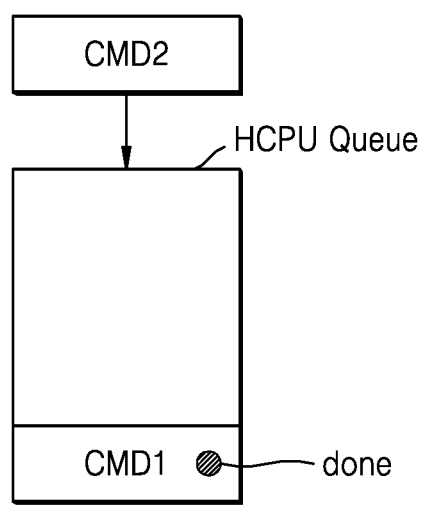

FIGS. 7A and 7B are diagrams describing a memory controller 400 including a CPU 420 to which the improvement of a performance level is desired, according to an example embodiment of the inventive concepts.

Referring to FIG. 7A, the memory controller 400 includes a host interface 410, the CPU 420, and a performance control module 430. The CPU 420 includes a host central processing unit (HCPU) 421 and a plurality of flash central processing units (FCPUs) 422_a to 422_n. The host interface 410 may receive a command (e.g., a read command, a write command, or an erase command) from the host 10 of FIG. 1 and provide the command to the HCPU 421. The HCPU 421 may process the command and provide a processed command CMDP to the plurality of FCPUs 422_a to 422_n. The plurality of FCPUs 422_a. to 422_n may respectively provide a plurality of commands CMD_~CMD_n corresponding to the processed command CMDP to a plurality of non-volatile memories 411 to 41n included in the non-volatile memory device 410.

In an example embodiment, when all the FCPUs 422_a to 422_n are in a state in which all the FCPUs 422_a to 422___n operate in response to the command CMDP received from the HCPU 421, the improvement of the performance levels of the FCPUs 422_a to 422_n may be desired. For example, when the CPU 420 receives a garbage collection command from a host, all the FCPUs 422_a to 422_p perform an operation in response to the garbage collection command. Thus, in order to perform an operation according to a command that is hereafter received from the host, it is desired to rapidly perform an operation corresponding to the garbage collection command, and thus, the improvement of the performance levels of the FCPUs 422 a to 422_u may be desired. The CPU 420 may provide an operating state signal OSS, which indicates that all the FCPUs 422_a to 422_p operate, to the performance control module 430. In this case, because the number of read or write commands received per unit time by the memory controller 420 from the host may be equal to or greater than a certain reference value, the improvement of the performance levels of the FCPUs 422_a to 422_n may be desired.

Referring to FIG. 7B, a queue of the HCPU 421 may store a first command CMD1 received from the host interface 410. The HCPU 421 may receive a second command CMD2 from the host interface 410 after finishing the processing of the first command CMD1. Accordingly, when a plurality of commands are received from the host interface 410, the first command CMD1 stored in the HCPU 421 may have to be processed in a relatively fast manner. Accordingly, the improvement of the performance level of the HCPU 421 may be desired. The HCPU 421 of the CPU 420 may process the first command CMD1 and provide the operating state signal OSS, which indicates a state in which the second command CMD2 has to be received, to the performance control module 430. In this case, because the number of read or write commands received per unit time by the memory controller 420 from the host may be equal to or greater than a certain reference value, the improvement of the performance level of the HCPU 421 may be desired. However, the inventive concepts are not limited thereto. For example, by providing an operating state signal OSS, which varies according to various states of the CPU 420, to the performance control module 430, the performance control module 430 may control the performance level of the CPU 420 based on the operating state signal OSS.

Figure 8:
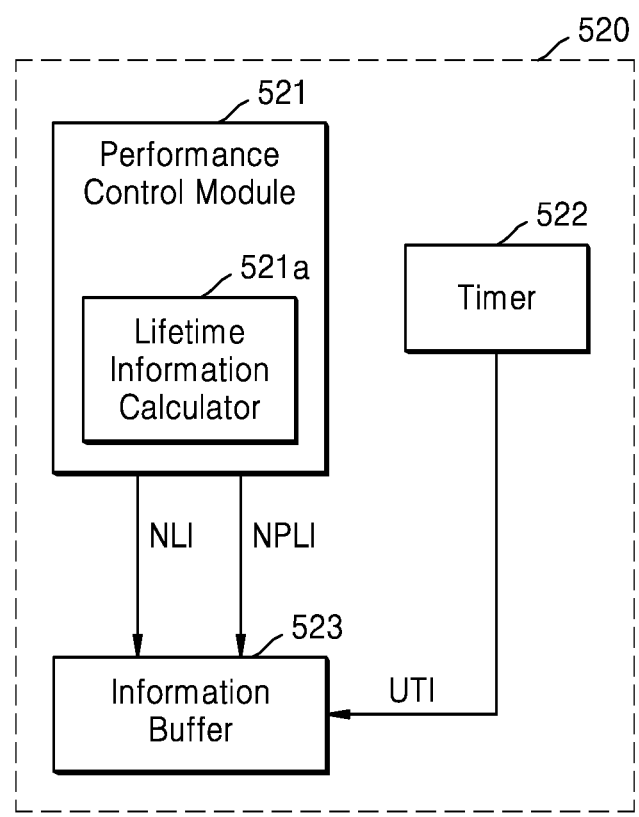
FIG. 8 is a block diagram of a memory controller according to an embodiment of the inventive concepts.

FIG. 8 is a block diagram of a memory controller 520 according to an example embodiment of the inventive concepts.

Referring to FIG. 8, the memory controller 520 includes a performance control module 521, a timer 522, and an information buffer 523. The performance control module 521 includes a lifetime information calculator 521a. A reduced lifetime may be calculated based on an operation execution time, which is a time during which the memory controller 520 performs an operation corresponding to an operation command received from a host, and a performance level of the memory controller 520 at the time when the operation is performed. The operation execution time may be counted by the timer 522. Through this operation, new lifetime information NLI including a new residual lifetime may be generated by subtracting the reduced lifetime from a residual lifetime included in lifetime information stored in the information buffer 523. The lifetime information is information about the lifetime of the memory controller 520 before the performing the operation corresponding to an operation command received from a host. The performance control module 521 may provide the new lifetime information NLI to the information buffer 523, and the information buffer 523 may update the lifetime information by storing the new lifetime information CLI. The information buffer 523 may store the updated lifetime information in a non-volatile memory device (not shown) before a power supply of the memory controller 520 is turned off, and may load the updated lifetime information from the non-volatile memory device when the power supply of the memory controller 520 is turned on, In addition, a performance level of the memory controller 520 at the time when the operation is performed may he provided to the information buffer 523 as new performance level information NPLI, and the information buffer 523 may store the new performance level information NPLI therein to update the performance information. The performance level is controlled in the performance control module 521.

The timer 522 may count the operation execution time and provide the counted operation execution time to the information buffer 523 as using time information UTI, and the information buffer 523 may add the using time information UTI to existing using time information and store the total using time information. The information buffer 523 may store the updated total using time information in a non-volatile memory device (not shown) before the power supply of the memory controller 520 is turned off, and may load the updated total using time information from the non-volatile memory device when the power supply of the memory controller 520 is turned on.

Figure 9:
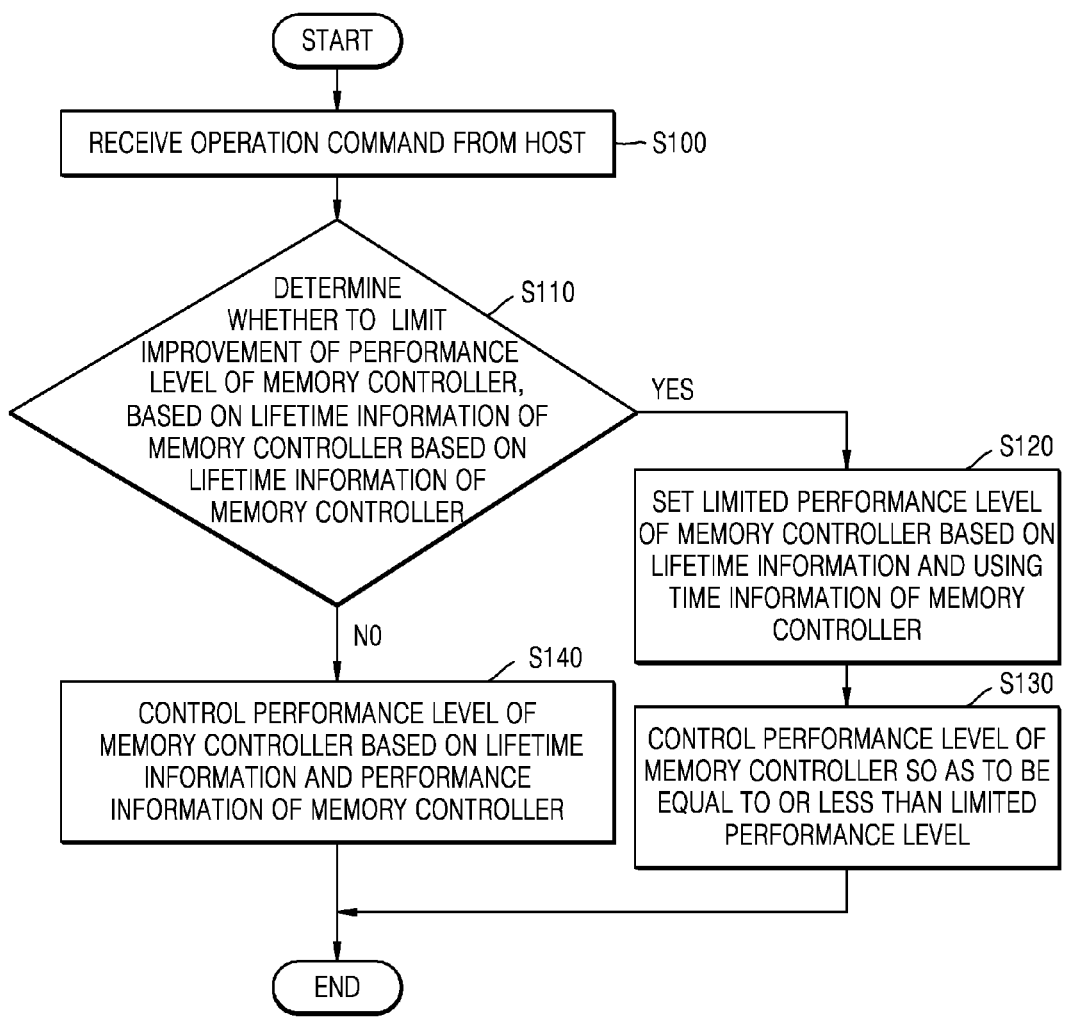
FIG. 9 is a flowchart illustrating a method of controlling a performance level of a memory controller, according to an example embodiment of the inventive concepts.

FIG. 9 is a flowchart illustrating a method of controlling a performance level of a memory controller, according to an example embodiment of the inventive concepts.

Referring to FIG. 9, the memory controller receives an operation command from a host (operation S100). It is determined whether to limit the improvement of the performance level of the memory controller based on lifetime information of the memory controller (operation S110). If it is determined that it is desired to limit the performance level of the memory controller, a limited performance level of the memory controller is set based on the lifetime information of the memory controller and using time information of the memory controller (operation S120). The performance level of the memory controller is controlled to be equal to or less than the limited performance level of the memory controller (operation S130). In another example embodiment, the performance level of the memory controller may be fixed to the limited performance level of the memory controller. Otherwise, if it is determined that it is not desired to limit the improvement of the performance level of the memory controller, the performance level of the memory controller may be controlled to have various levels without a level limit based on the lifetime information and the performance information of the memory controller (operation S140).

Figure 10:
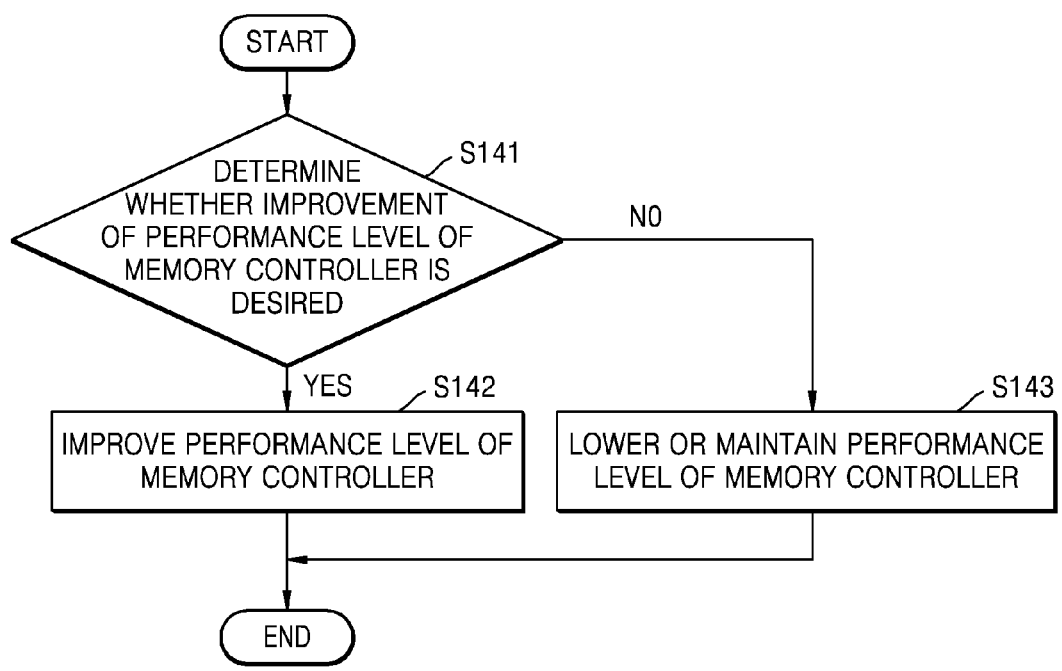
FIG. 10 is a flowchart illustrating operations after operation S140 of FIG, 9, according to an example embodiment of the inventive concepts.

FIG. 10 is a flowchart illustrating operations after operation S140, according to an example embodiment of the inventive concepts, Referring to FIG. 10, it is determined whether the improvement of the performance level of the memory controller is desired before controlling the performance level of the memory controller (operation S141). It may be determined whether the improvement of the performance level of the memory controller is desired based on an operating state of the memory controller. If it is determined that the improvement of the performance level of the memory controller is desired, the performance level of the memory controller is improved based on the lifetime information of the memory controller and the performance information of the memory controller (operation S142). Otherwise, if it is determined that the improvement of the performance level of the memory controller is not desired, the performance level of the memory controller is maintained or lowered based on the lifetime information of the memory controller and the performance information of the memory controller (operation S143).

Figure 11:
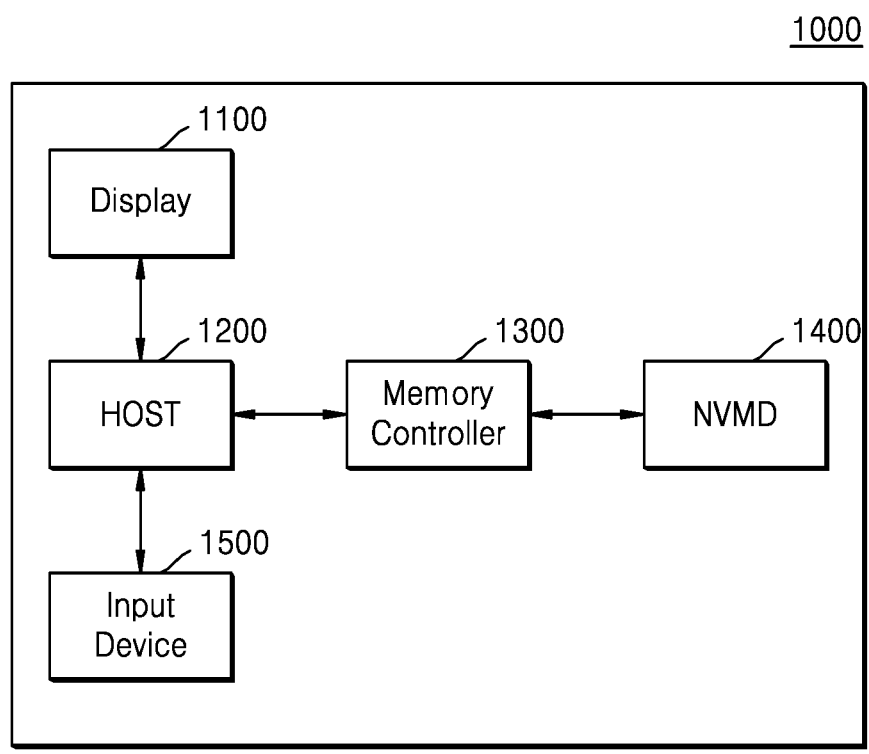
FIG. 11 is a block diagram of a computer system including a memory controller illustrated in FIG. 1, according to an example embodiment of the inventive concepts.

FIG. 11 is a block diagram of a computer system 1000 including the memory controller 120 illustrated in FIG. 1, according to an example embodiment of the inventive concepts.

Referring to FIG. 11, the computer system 1000 may be implemented as a personal computer (PC), a network server, a tablet PC, a netbook, an e-reader, a personal digital assistant (PDA), a portable multimedia player (PMP), an MP3 player, or an MP4 player.

The computer system 1000 includes a host 1200, a non-volatile memory device 1400, a memory controller 1300 for controlling a data processing operation of the non-volatile memory device 1400, a display 1100, and an input device 1500. The host 1200 may control the display 1100 to display data stored in the non-volatile memory device 1400 on the display 1100 according to data input through the input device 620. The memory controller 1300 may correspond to the memory controller 120 illustrated in FIG. 1. For example, the input device 1500 may be a pointing device, such as a touch pad or a computer mouse, a keypad, or a keyboard. The host 1200 may control an overall operation of the computer system 1000 and control an operation of the memory controller 1300. According to an example embodiment, the memory controller 1300 for controlling an operation of the non-volatile memory device 1400 may be implemented as a chip that is separate from the host 1200.

The memory controller 1300 may perform a relatively fast operation in response to an operation command of the host 1200 by controlling the performance level of the memory controller 1300 while satisfying an expected using time of the memory controller 1300, as described with reference to FIG. 1.

Figure 12:
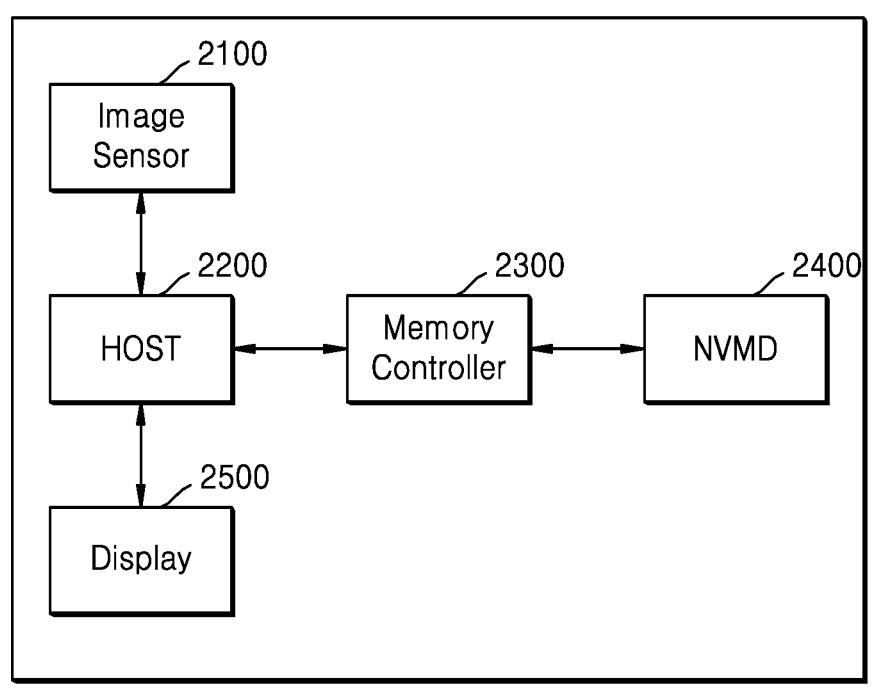
FIG. 12 is a block diagram of a computer system including the memory controller illustrated in FIG. 1, according to an example embodiment of the inventive concepts.

FIG. 12 is a block diagram of a computer system 2000 including the memory controller 120 illustrated in FIG. 1, according to another example embodiment of the inventive concepts.

Referring to FIG. 12, the computer system 2000 may be implemented as an image processing device, for example, a digital camera, a mobile phone mounted with a digital camera, or a smart phone mounted with a digital camera.

The computer system 2000 includes a host 2200, a non-volatile memory device 2400, and a memory controller 2300 for controlling a data processing operation of the non-volatile memory device 2400, for example, a write operation, a read operation, or an erase operation. Also, the computer system 2000 may further include an image sensor 2100 and a display 2500. The memory controller 2300 may correspond to the memory controller 120 illustrated in FIG. 1.

The image sensor 2100 of the computer system 2000 converts an optical image into digital signals and transmits the digital signals to the host 2200 or the memory controller 2300. The digital signals may be displayed on the display 2500 or stored in the non-volatile memory device 2400 through the memory controller 2300, according to the control of the host 2200.

The memory controller 2300 may perform a relatively fast operation in response to an operation command of the host 2200 by controlling the performance level of the memory controller 2300 while satisfying an expected using time of the memory controller 2300, as described with reference to FIG. 1.

Further, data stored in the non-volatile memory device 2400 is displayed on the display 2500 according to the control of the host 2200 or the memory controller 2300. According to an example embodiment, the memory controller 2300 for controlling an operation of the non-volatile memory device 2400 may be implemented as a chip that is separate from the host 2200.

Figure 13:
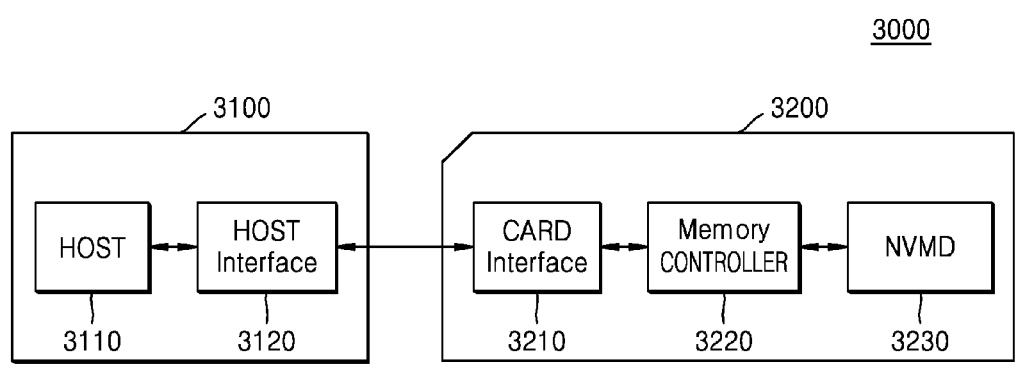
FIG. 13 is a block diagram of a computer system including the memory controller illustrated in FIG. 1, according to an example embodiment of the inventive concepts.

FIG. 13 is a block diagram of a computer system 3000 including the memory controller 120 illustrated in FIG. 1, according to another example embodiment of the inventive concepts.

Referring to FIG. 13, the computer system 3000 includes a host computer 3100 and a memory card 3200 (or a smart card).

The host computer 3100 includes a host 3110 and a host interface 3120. The memory card 3200 includes a non-volatile memory device 3230, a memory controller 3220, and a card interface 3210. The memory controller 3220 may correspond to the memory controller 120 illustrated in FIG. 1. The memory controller 3220 may control the exchange of data between the non-volatile memory device 3230 and the card interface 3210. According to an example embodiment, the card interface 3210 may be a secure digital (SD) card interface or a multi-media card (MMC) interface, but is not limited thereto.

When the memory card 3200 is mounted on the host computer 3100, the card interface 3200 may interface data exchange between the host 3110 and the memory controller according to a protocol of the host 3110.

The memory controller 3220 may perform a relatively fast operation in response to an operation command of the host 3110 by controlling the performance level of the memory controller 3220 while satisfying an expected using time of the memory controller 3220, as described with reference to FIG. 1.

According to an example embodiment, the card interface 3210 may support a universal serial bus (USB) protocol and an interchip (IC)-USB protocol. The card interface 3210 may mean hardware for supporting a protocol that is used by the host computer 3110, software installed on the hardware, or a signal transmission method. When the computer system 3000 is connected to the host interface 3120 of the host computer 3100, such as a PC, a tablet PC, a digital camera, a digital audio player, a mobile phone, a console video game hardware, or a digital set-top box, the host interface 3120 may perform data communication with the non-volatile memory device 3230 through the card interface 3210 and the memory controller 3220 according to the control of the host 3110.

The inventive concepts can also be embodied as at least one processor executing computer-readable codes stored in a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices. etc. The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

While the inventive concept have been particularly shown and described with reference to some example embodiments thereof, it will be understood that various changes in form and details may be made therein without departing from the spirit and scope of the following claims.

What is claimed is:

1. A semiconductor storage device comprising:
a non-volatile memory device; and
a memory controller configured to control the non-volatile memory device, the memory controller including a performance control module, the performance control module configured to control a performance level of the memory controller based on state information of the memory controller, the state information including lifetime information of the memory controller and performance information of the memory controller.

2. The semiconductor storage device of claim 1, wherein the performance information includes an initial performance level of the memory controller before performing any operations, and the lifetime information includes at least one of an initial lifetime, a reduced lifetime, and a residual lifetime of the memory controller.

3. The semiconductor storage device of claim 1, further comprising:
a timer configured to count an operation execution time of the memory controller and store the time as a using time information of the memory controller,
wherein when a using time included in the using time information is equal to or greater than a reference using time included in reference using time information and a lifetime included in the lifetime information is equal to or less than a reference lifetime included in reference lifetime information, the performance control module is configured to set a limited performance level of the memory controller based on the lifetime information and the using time information, and control the performance level of the memory controller so as to be equal to or less than the limited performance level.

4. The semiconductor storage device of claim 3, wherein the memory controller further includes a clock signal generator, and the clock signal generator is configured to generate a clock signal having a frequency that varies according to an input voltage, and
wherein when the limited performance level of the memory controller is set, the performance control module is configured to control the performance level of the memory controller so as to be equal or less than the limited performance level by limiting the input voltage supplied to the clock signal generator.

5. The semiconductor storage device of claim 4, wherein the performance control module is configured to determine whether to control the performance level of the memory controller based on an operating state of the memory controller.

6. The semiconductor storage device of claim 5, wherein the performance control module is further configured to,
increase the input voltage when an improvement of the performance level of the memory controller is desired, and
decrease or maintain the input voltage when the improvement of the performance level of the memory controller is not desired.

7. The semiconductor storage device of claim 1, wherein the memory controller further includes a lifetime information calculator, and the lifetime information calculator is configured to update the lifetime information with new lifetime information.

8. The semiconductor storage device of claim 1, wherein the performance level of the memory controller corresponds to at least one of a number of commands processed by the memory controller per unit time, an amount of data written by the memory controller per unit time, and an amount of data read by the memory controller per unit time.

9. The semiconductor storage device of claim 1, further comprising:
an information buffer configured to store the state information.

10. The semiconductor storage device of claim 1, wherein the semiconductor storage device is a solid state drive (SSD) or a secure digital (SD) card.

11. A method of operating a memory controller for controlling a non-volatile memory device, the method comprising:
receiving an operation command from a host;
determining whether to limit a performance level of the memory controller based on lifetime information of the memory controller, the determining including,
determining whether a using time included in using time information generated by counting an operation execution time of the memory controller is equal to or greater than a reference using time included in reference using time information, and
determining whether a lifetime included in the lifetime information is equal to or less than a reference lifetime included in reference lifetime information;
controlling the performance level of the memory controller based on a result of the determining; and
performing an operation corresponding to the operation command at the performance level.

12. The method of claim 11, wherein the controlling comprises:
setting a limited performance level of the memory controller when the using time is equal to or greater than the reference using time and the lifetime is equal to or less than the reference lifetime; and
adjusting the performance level of the memory controller so as to be equal to or less than the limited performance level.

13. The method of claim 11, further comprising:
determining whether an adjustment of the performance level of the memory controller is desired based on an operating state of the memory controller,
wherein the controlling the performance level of the memory controller includes,
improving the performance level of the memory controller based on at least one of the lifetime information of the memory controller and performance information of the memory controller, if it is determined that the improvement of the performance level of the memory controller is desired; and
maintaining or lowering the performance level of the memory controller if it is determined that the improvement of the performance level of the memory controller is not desired.

14. A semiconductor storage device comprising:
a non-volatile memory device; and
a memory controller configured to control the non-volatile memory device according to a command from a host, the memory controller including,
a host interface configured to exchange at least one of commands and data with a host,
an information buffer configured to store state information, the state information including lifetime information of the memory controller and performance information of the memory controller, and
a processor configured to receive the state information from the information buffer and control a performance level of the memory controller based on the state information thereof and an expected using time thereof.

15. The semiconductor storage device of claim 14, wherein the memory controller further includes a central processing unit (CPU), the CPU is configured to execute a data read or a data write operation to or from the non-volatile memory device, and the processor is further configured to set a performance level of the CPU as a performance level of the memory controller.

16. The semiconductor storage device of claim 15, wherein the memory controller further includes a clock signal generator, the clock signal generator is configured to generate a clock signal having a frequency varying according to an input voltage, and the processor is further configured to control the performance level of the CPU by adjusting a clock frequency applied to the CPU based on a state information of the CPU and an expected using time of the CPU.

17. The semiconductor storage device of claim 14, wherein the performance information includes the performance level after completing an immediate previous operation, and the lifetime information includes at least one of an initial lifetime, a reduced lifetime, and a residual lifetime of the memory controller.

18. The semiconductor storage device of claim 14, wherein the memory controller further includes a timer configured to count an operation execution time of the memory controller and store the time in the information buffer as a using time information of the memory controller.

* * * * *